(12) United States Patent
Rothbauer

(10) Patent No.: US 11,691,401 B2
(45) Date of Patent: *Jul. 4, 2023

(54) NAIL SEALABLE MULTILAYERED FILM

(71) Applicant: Charter Next Generation, Inc., Milton, WI (US)

(72) Inventor: Jason L. Rothbauer, Bloomer, WI (US)

(73) Assignee: Charter Next Generation, Inc., Milton, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/478,270

(22) Filed: Sep. 17, 2021

(65) Prior Publication Data

US 2022/0001656 A1  Jan. 6, 2022

Related U.S. Application Data

(63) Continuation of application No. 16/600,876, filed on Oct. 14, 2019, now Pat. No. 11,123,966.

(60) Provisional application No. 62/748,351, filed on Oct. 19, 2018.

(51) Int. Cl.
| | | |
|---|---|---|
| *B32B 27/30* | (2006.01) | |
| *B32B 27/08* | (2006.01) | |
| *B32B 27/32* | (2006.01) | |
| *E04B 1/66* | (2006.01) | |
| *E06B 1/62* | (2006.01) | |
| *B32B 7/12* | (2006.01) | |
| *B32B 27/20* | (2006.01) | |
| *B32B 27/18* | (2006.01) | |
| *E04B 1/62* | (2006.01) | |

(52) U.S. Cl.
CPC ............ *B32B 27/306* (2013.01); *B32B 27/08* (2013.01); *B32B 27/32* (2013.01); *B32B 2250/05* (2013.01); *B32B 2307/306* (2013.01); *E04B 1/66* (2013.01); *E06B 1/62* (2013.01); *E06B 2001/628* (2013.01)

(58) Field of Classification Search
None
See application file for complete search history.

(56) References Cited

U.S. PATENT DOCUMENTS

| | | |
|---|---|---|
| 6,103,152 A | 8/2000 | Gehlsen et al. |
| 6,797,371 B1 | 9/2004 | Gehlsen et al. |
| 6,919,405 B2 | 7/2005 | Kinning et al. |
| 6,921,729 B2 | 7/2005 | Schwab et al. |
| 7,022,631 B2 | 4/2006 | Schmid |
| 7,063,887 B2 | 6/2006 | Kobe et al. |
| 7,229,687 B2 | 6/2007 | Kinning et al. |
| 7,282,250 B2 | 10/2007 | Musahl et al. |
| 7,445,828 B2 | 11/2008 | Sieber et al. |
| 7,641,952 B2 | 1/2010 | O'Rourke et al. |
| 7,682,675 B2 | 3/2010 | Boge et al. |

(Continued)

*Primary Examiner* — Ramsey Zacharia
(74) *Attorney, Agent, or Firm* — Foley & Lardner LLP

(57) ABSTRACT

A multilayer film is provided. The film includes a first inert layer, a first tie layer, a nail sealable layer, a second tie layer, and a second inert layer. Where, the nail sealable layer is between the first tie layer and the second tie layer, the first tie layer is between the first inert layer and the nail sealable layer, the second tie layer is between the second inert layer and the nail sealable layer, the total film thickness is between 0.002 inch and 0.010 inch, and the film has a Water Vapor Transmission Rate of less than 0.5 grams per one hundred square inches per day.

20 Claims, 1 Drawing Sheet

(56) References Cited

U.S. PATENT DOCUMENTS

| | | |
|---|---|---|
| 7,718,250 B2 | 5/2010 | Sieber et al. |
| 7,790,258 B2 | 9/2010 | Blum et al. |
| 8,233,773 B2 | 7/2012 | Yuen et al. |
| 8,291,663 B2 | 10/2012 | Banta |
| 8,329,275 B2 | 12/2012 | Deiss |
| 8,444,790 B2 | 5/2013 | Tong |
| 8,490,338 B2 | 7/2013 | Longo |
| 8,530,021 B2 | 9/2013 | Bartusiak et al. |
| 8,551,594 B2 | 10/2013 | Deiss |
| 8,673,419 B2 | 3/2014 | Determan et al. |
| 8,932,704 B2 | 1/2015 | Porbeni et al. |
| 8,973,329 B2 | 3/2015 | Milostic et al. |
| RE45,747 E | 10/2015 | Gehlsen et al. |
| 9,238,758 B2 | 1/2016 | Determan et al. |
| 11,123,966 B2 * | 9/2021 | Rothbauer ................ B32B 7/12 |
| 2012/0085063 A1 | 4/2012 | Pufahl |
| 2013/0022779 A1 | 1/2013 | Schroeer et al. |
| 2016/0060863 A1 | 3/2016 | Deiss |
| 2016/0319165 A1 | 11/2016 | Choi et al. |
| 2017/0058510 A1 | 3/2017 | Seabaugh et al. |
| 2017/0072430 A1 | 3/2017 | Maier et al. |
| 2017/0173916 A1 | 6/2017 | Widenbrant et al. |
| 2017/0218223 A1 | 8/2017 | Bodkhe et al. |
| 2019/0203006 A1 | 7/2019 | Abubakar et al. |

* cited by examiner

NAIL SEALABLE MULTILAYERED FILM

CROSS-REFERENCE TO RELATED APPLICATIONS

The present application is a continuation of U.S. patent application Ser. No. 16/600,876, filed Oct. 14, 2019, which claims the benefit of and priority to U.S. Provisional Patent Application No. 62/748,351, filed Oct. 19, 2018, each of which is incorporated by reference herein in its entirety.

FIELD

The present disclosure is generally related to multilayer films and methods for producing such films. In particular, the films are nail sealable and may be useful for sealing a gap between two substrates.

SUMMARY OF THE INVENTION

One implementation of the present disclosure is a multilayer film. The film includes a first inert layer, a first tie layer, a nail sealable layer, a second tie layer, and a second inert layer. Where, the nail sealable layer is between the first tie layer and the second tie layer, the first tie layer is between the first inert layer and the nail sealable layer, the second tie layer is between the second inert layer and the nail sealable layer, the total film thickness is between 0.002 inch and 0.010 inch, and the film has a Water Vapor Transmission Rate of less than 0.5 grams per one hundred square inches per day.

Another implementation of the present disclosure is a process for forming a multilayer film. The process includes providing a first extruder for extruding a first material; providing a second extruder for extruding a second material; providing a third extruder for extruding a third material; providing a die fluidly coupled to the first extruder, the second extruder and the third extruder; and simultaneously co-extruding the first material, the second material, and the third material through the die to form a multilayer film. The multilayer film including, a first inert layer of the first material, a first tie layer of the second material, a nail sealable layer of the third material, a second tie layer of the second material, and a second inert layer of the first material. Where, the nail sealable layer is between the first tie layer and the second tie layer, the first tie layer is between the first inert layer and the nail sealable layer, the second tie layer is between the second inert layer and the nail sealable layer, and the total film thickness is between 0.002 inch and 0.010 inch.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Figure 1:
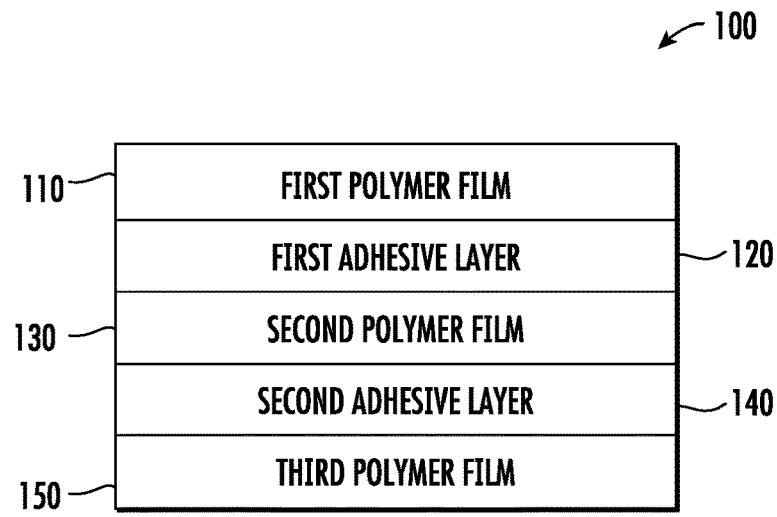
FIG. 1 is a schematic illustration of a multilayer film, according to an exemplary embodiment.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

According to exemplary embodiments, film 100 is a cast embossed polymeric film that provides nail sealability, formable stretch properties, and cold weather durability. Film 100 may be used as a component of weather resistant barrier applications, for example as a component of flashing tape for sealing around openings and penetrations in exterior walls. For example, flashing tape including film 100 may be used as flashing at a window opening in a wall to protect the joint between the window opening and the wall. Film 100 may also be used as a component of a roofing underlayment. Film 100 may also be used as a component of patching tape for sealing penetrations through building membranes on a wall or roof, such as brick ties. Film 100 may also be used as a component of flashing tape or patching tape that is dispensed without the use of a separate release liner.

Applicant has found that the film 100 provides improved nail sealability over conventional nail sealable films used in flashing tape, roofing underlayment, patching tape, and other weather resistant barrier applications. Nail sealability is a term of art in the building industry and can be determined by various standardized tests. Those tests include American Architectural Manufacturers Association ("AAMA") AAMA 711-05 (Voluntary Specification for Self Adhering Flashing Use for Installation of Exterior Wall Fenestration Product), AAMA 711-13 (Voluntary Specification for Self Adhering Flashing Used for Installation of Exterior Wall Fenestration Products), ASTM E331 (Standard Test Method for Water Penetration of Exterior Windows, Skylights, Doors, and Curtain Walls by Uniform Static Air Pressure Difference), ASTM E547 (Standard Test Method for Water Penetration of Exterior Windows, Skylights, Doors, and Curtain Walls by Cyclic Static Air Pressure Difference).

Upon puncturing the film 100 with a nail or other similar sharp object, the film 100 conforms or closely surrounds the nail to seal the puncture or hole in the film 100 and provides nail sealability appropriate for the film's use in flashing tapes, roofing underlayments, patching tapes, and other weather resistant barrier applications. Applicant has tested samples of the film 100 and the film 100 achieved the physical traits set forth in the table below when tested according to the indicated test method.

| Physical Trait | Value | Unit of Measure | Test Method |
| --- | --- | --- | --- |
| Emboss Thickness | 4.8 | mil | ASTM D 374 type D |
| Yield | 4 | mil | ASTM E 252 |
| Tensile (MD) | 4,654.7 | psi | ASTM D 822 |
| Tensile (TD) | 3,454.3 | psi | ASTM D 822 |
| Tensile Yield (MD) | 5.9 | lbf | ASTM D 822 |
| Tensile Yield (TD) | 5.2 | lbf | ASTM D 822 |
| Elongation (MD) | 962.0 | % | ASTM D 822 |
| Elongation (TD) | 919.3 | % | ASTM D 822 |
| 1% Secant Modulus (MD) | 39,998.4 | psi | ASTM D 822 |
| 1% Secant Modulus (TD) | 33,104.2 | psi | ASTM D 822 |
| Spencer Impact | 1.29 | Joules | ASTM D 3420 |
|  | 23.96 | % | using 6400 grams |

-continued

| Physical Trait | Value | Unit of Measure | Test Method |
|---|---|---|---|
| Dart Drop | 1,015.00 | | ASTM D 1709 A/B |
| Slow Puncture | 5.17 0.009 | lbf J | ASTM D 5748 |
| Water Vapor Transmission Rate | 0.39 | g/(100 in²-day) | ASTM F 1249 |

Applicant has conducted testing that shows the film 100 pass tests for nail sealability (including the Dart Drop and Slow Puncture tests identified in the table above) at a total film thickness between 2 mils (0.002 inch or 0.0508 mm) and 10 mils (0.010 inch or 0.254 mm). Films 100 having a total film thickness between 2 mils (0.002 inch or 0.0508 mm) and 10 mils (0.010 inch or 0.254 mm) also pass the same nail sealability tests. In some embodiments, the total film thickness of the film 100 is between 3 mils (0.003 inch or 0.0762 mm) and 6 mils (0.006 inch or 0.1524 mm). In some embodiments, the total film thickness of the film 100 is between 4 mils (0.004 inch or 0.1016 millimeter) and 6 mils (0.006 inch or 0.1524 mm).

As shown in FIG. 1, the film 100 includes a first inert layer 110, a first tie layer 120, a nail sealable layer 130, a second tie layer 140, and a second inert layer 150. The inert layers 110 and 150 are inert polyolefin layers that provide coatability, cold weather resistance, and some stretch to the film 100. In some embodiments, the inert layers 110 and 150 are formed from the same materials. In some embodiments, the inert layers 110 and 150 are formed from different materials. The tie layers 120 and 140 provide toughness and some incremental nail sealability. In some embodiments, the tie layers 120 and 140 are formed from polyethylene copolymers. In some embodiments, the tie layers 120 and 140 are formed from the same materials. In some embodiments, the tie layers 120 and 140 are formed from different materials.

In a preferred embodiment, the inert layers 110 and 150 include but are not limited to low density polyethylene with a melt index between 1.5 and 4 and a density between 0.918 and 0.924 g.cm³, ethylene vinyl acetate copolymer resin with a vinyl acetate percentage between 9 and 20%, and a density range of 0.929 and 0.941 g/cm³, a performance polymer composed of isotactic propylene repeat units with random ethylene distribution with a melt flow rate between 3 and 21 grams/10 minutes , a talc based antiblock, an ultra violet ("UV") light stabilizer (e.g., a synergistic blend of hindered amine light stabilizer and antioxidant), and a slip additive (e.g., oleamide, erucamide, etc.).

In a preferred embodiment, the tie layers 120 and 140 include but are not limited to a performance polymer composed of isotactic propylene repeat units with random ethylene distribution with a melt flow rate between 3 and 21 grams/10 minutes, a polypropylene impact modified copolymer with a melt flow rate between 3 and 11 grams/10 minutes, an advanced reactor thermoplastic polyolefin with a melt flow rate between 4 and 10 grams/10 minutes, a UV light stabilizer (e.g., a synergistic blend of hindered amine light stabilizer and antioxidant) and colorant or other additives.

In a preferred embodiment, the nail sealable layer 130 includes but is not limited to a polypropylene impact modified copolymer with a melt flow rate between 3 and 11 grams/10 minutes, a thermoplastic elastomer with a melt flow rate between 2 and 6 grams/10 minutes and a density between 0.88 and 0.93 g/cm³, a mineral filler (e.g., a carrier resin with 60% talc), and colorant or other additives.

In some embodiments, the colorant is an inorganic pigment, an organic pigment, a dye, or a mixture of any two or more such compounds. Non-limiting examples of pigments include bright pigments such as aluminum powder, copper powder, nickel powder, stainless steel powder, chromium powder, micaceous iron oxide, titanium dioxide-coated mica powder, iron oxide-coated mica powder, and bright graphite; organic red pigments such as Pink EB, azo- and quinacridone-derived pigments; organic blue pigments such as cyanin blue and cyanin green; organic yellow pigments such as benzimidazolone-, isoindolin- and quinophthalone-derived pigments; inorganic colored pigments such as titanium dioxide (white), titanium yellow, iron red, carbon black, chrome yellow, iron oxide and various calcined pigments. Additionally, extender pigments may be included. Other examples of suitable pigments include, but are not limited to, Raven 7000, Raven 5750, Raven 5250, Raven 5000 ULTRAII, Raven 3500, Raven 2000, Raven 1500, Raven 1250, Raven 1200, Raven 1190 ULTRAII, Raven 1170, Raven 1255, Raven 1080 and Raven 1060 (commercially available from Columbian Carbon Co.); Rega1400R, Rega1330R, Rega1660R, Mogul L, Black Pearls L, Monarch 700, Monarch 800, Monarch 880, Monarch 900, Monarch 1000, Monarch 1100, Monarch 1300 and Monarch 1400 (commercially available from Cabot Co.); Color Black FW1, Color Black FW2, Color Black FW2V, Color Black 18, Color Black FW200, Color Black S150, Color Black S160, Color Black S170, Printex35, PrintexU, PrintexV, Printex140U, Printex140V, Special Black 6, Special Black 5, Special Black 4A and Special Black 4 (commercially available from Degussa Co.); No. 25, No. 33, No. 40, No. 47, No. 52, No. 900, No. 2300, MCF-88, MA600, MA7, MA8 and MA100 (commercially available from Mitsubishi Chemical Corporation); cyanic color pigment like C.I. Pigment Blue-1, C.I. Pigment Blue-2, C.I. Pigment Blue-3, C.I. Pigment Blue-15, C.I. Pigment Blue-15:1, C.I. Pigment Blue-15:3, C.I. Pigment Blue-15:34, Pigment Blue 15:4; C.I. Pigment Blue-16, C.I. Pigment Blue-22 and C.I. Pigment Blue-60; magenta color pigment like C.I. Pigment Red-5, C.I. Pigment Red-7, C.I. Pigment Red-12, C.I. Pigment Red-48, C.I. Pigment Red-48:1, C.I. Pigment Red-57, Pigment Red-57:1, C.I. Pigment Red-112, C.I. Pigment Red-122, C.I. Pigment Red-123, C.I. Pigment Red-146, C.I. Pigment Red-168, C.I. Pigment Red-184 and C.I. Pigment Red-202; and yellow color pigment like C.I. Pigment Yellow-1, C.I. Pigment Yellow-2, C.I. Pigment Yellow-3, C.I. Pigment Yellow-12, C.I. Pigment Yellow-13, C.I. Pigment Yellow-14, C.I. Pigment Yellow-16, C.I. Pigment Yellow-17, C.I. Pigment Yellow-73, C.I. Pigment Yellow-74, C.I. Pigment Yellow-75, C.I. Pigment Yellow-83, C.I. Pigment Yellow-93, C.I. Pigment Yellow-95, C.I. Pigment Yellow-97, C.I. Pigment Yellow-98, C.I. Pigment Yellow-114, C.I. Pigment Yellow-128, C.I. Pigment Yellow-129, C.I. Pigment Yellow-151 and C.I. Pigment Yellow-154. Suitable pigments include a wide variety of carbon black, blue, red, yellow, green, violet, and orange pigments.

In some embodiments, the other additives may include an adhesion promoter to improve the adhesion between the layers of the film 100. Suitable adhesion promoters include, but are not limited to, titanium chelates, organosilane, polyacrylic acid, and polymethlacrylic acid.

In a preferred embodiment, the inert layers 110 and 150 comprise 25% of the weight of the film, the tie layers 120 and 140 comprise 45% of the weight of the film, and the nail sealable layer 130 comprises 30% of the weight of the film.

In some embodiments, the inert layers 110 and 150 are about 20% to about 30% of the weight of the film 100, based on the total composition. In some embodiments, the nail sealable layer 130 is about 25% to about 35% of the weight of the film, based on the total composition. In some embodiments, the tie layers 120 and 140 are about 40% to about 50% of the weight of the film, based on the total composition. In some embodiments, the weight of the film 100 based on the total composition includes about 20% to about 30% of the inert layers 110 and 150, about 25% to about 35% of the nail sealable layer 130, and about 40% to about 50% of the tie layers 120 and 140.

The film 100 may be as a component of flashing tape or patching tape. Such tapes include the film 100 and an adhesive layer for securing the tape. Conventional flashing tapes and patching tapes rely on the adhesive layer to provide a significant contribution to the nail sealability of the tape, such that the nail sealable films used conventional tapes are unable to pass nail sealability tests without the inclusion of the adhesive layer used in the tape. These conventional nail sealable films are unable to pass the same nail sealability tests as the film 100. In tapes using the film 100, the amount of adhesive used in the adhesive layer (e.g., the adhesive coat weight) can be greatly reduced as compared to conventional tapes, saving on materials and associated costs for manufacturing the tape. The film 100 reduces the dependency on the adhesive layer of the tape to contribute to the nail sealability of the tape, thereby improving the nail sealability performance of the tape and reducing the overall cost. Similar performance and cost improvements can be realized by using the film 100 in roof underlayments or other weather resistant barrier applications.

Figure 2:
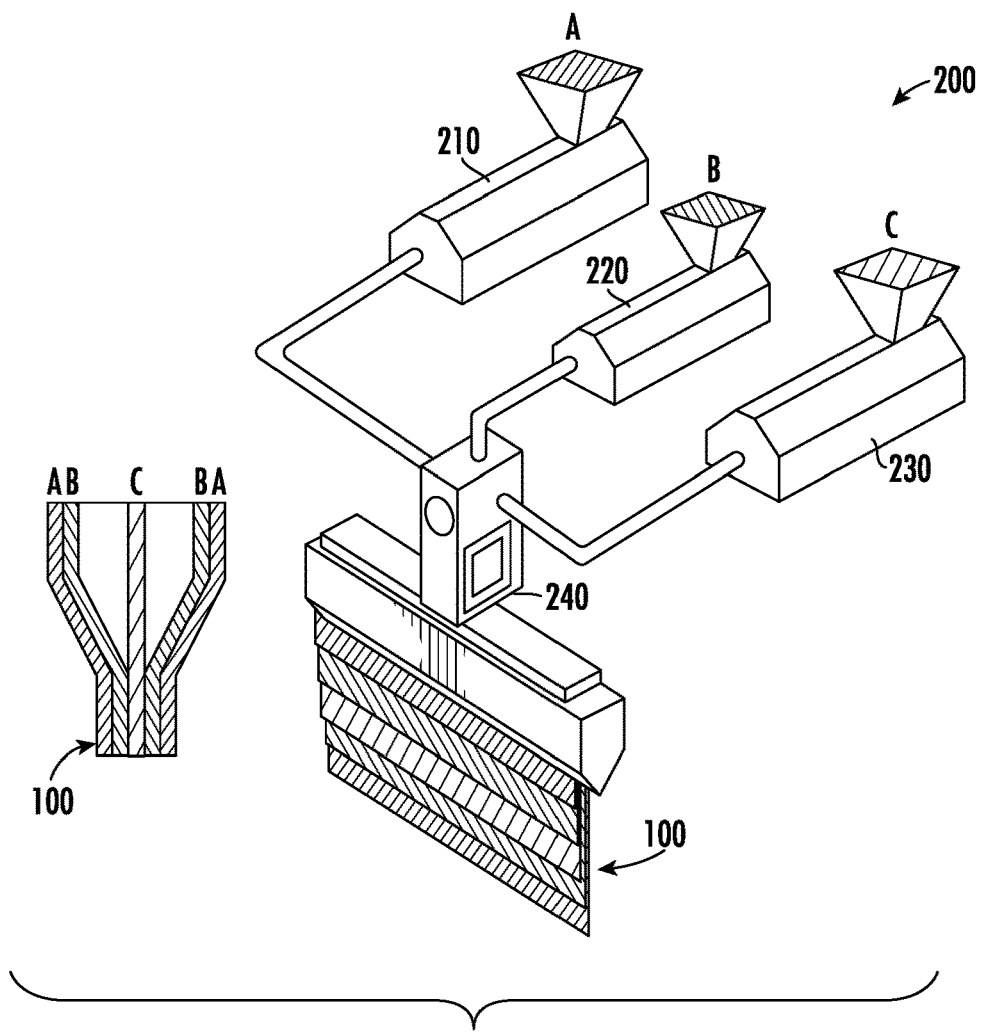
FIG. 2 is a schematic illustration of a process of making the multilayer film of FIG. 1, according to an exemplary embodiment.

As illustrated in FIG. 2, in some embodiments, the film 100 is formed according to an exemplary cast process 200 utilizing three extruders 210, 220, and 230. Each of the three extruders 210, 220, and 230 is fluidly coupled to feed material to a die 240. Each of the three materials is simultaneous extruded from the die 240 to form the multi-layered film 100. Extruder 210 provides the material used to form the two inert layers 110 and 150, extruder 220 provides the material used to form the two tie layers 120 and 140, and extruder 230 provides the material used to form the nail sealable layer 130. In some embodiments, the film 100 is also embossed.

While certain embodiments have been illustrated and described, it should be understood that changes and modifications can be made therein in accordance with ordinary skill in the art without departing from the technology in its broader aspects as defined in the following claims.

The embodiments illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein may be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed is:

1. A multilayer film, comprising:
   a first inert layer;
   a first tie layer;
   a nail sealable layer;
   a second tie layer; and
   a second inert layer;
   wherein the nail sealable layer is between the first tie layer and the second tie layer;
   wherein the first tie layer is between the first inert layer and the nail sealable layer;
   wherein the second tie layer is between the second inert layer and the nail sealable layer; and
   wherein the total film thickness is between 0.002 inch and 0.010 inch and wherein the film has a Water Vapor Transmission Rate of less than 0.5 grams per one hundred square inches per day.

2. The film of claim 1, wherein the total film thickness is between 0.003 inch and 0.006 inch.

3. The film of claim 2, wherein the total film thickness is greater than 0.004 inch.

4. The film of claim 1, wherein the nail sealable layer comprises a polypropylene impact modified copolymer.

5. The film of claim 1, wherein the nail sealable layer comprises a thermoplastic elastomer.

6. The film of claim 1, wherein the film has a Dart Drop value of greater than 1000.

7. The film of claim 3, wherein the film has a Dart Drop value of 1015 or greater.

8. The film of claim 1, wherein the film has a Slow Puncture trait of 0.009 joule or greater.

9. The film of claim 1, wherein the film has a Water Vapor Transmission Rate of 0.39 grams per one hundred square inches per day.

10. The film of claim 1, wherein the first tie layer and the second tie layer are the same material.

11. The film of claim 10, wherein the first tie layer and the second tie layer comprise a polypropylene impact modified copolymer and a thermoplastic polyolefin.

12. The film of claim 1, wherein the first inert layer and the second inert layer are the same material.

13. The film of claim 12, wherein the first inert layer and the second inert layer comprise a low-density polyethylene and an ethylene vinyl acetate copolymer resin.

14. The film of claim 1,
   wherein the first tie layer and the second tie layer comprise a polypropylene impact modified copolymer and a thermoplastic polyolefin; and
   wherein the first inert layer and the second inert layer comprise a low density polyethylene and an ethylene vinyl acetate copolymer resin.

15. The film of claim 1, wherein the film is formed by a cast extrusion process.

16. The film of claim 1, wherein the first inert layer and the second inert layer comprise between about 20% to about 30% of the weight of the film, the first tie layer and the second tie layer comprise between about 40% to about 50% of the weight of the film, and the nail sealable layer comprises between about 25% to about 35% of the weight of the film.

17. The film of claim 14, wherein the first inert layer and the second inert layer comprise 25% of the weight of the film, the first tie layer and the second tie layer comprise between about 45% of the weight of the film, and the nail sealable layer comprises between about 30% of the weight of the film.

18. A process for forming a multilayer film, comprising:
   providing a first extruder for extruding a first material;
   providing a second extruder for extruding a second material;
   providing a third extruder for extruding a third material;
   providing a die fluidly coupled to the first extruder, the second extruder, and the third extruder; and
   simultaneously co-extruding the first material, the second material, and the third material through the die to form a multilayer film, wherein the multilayer film comprises:
   a first inert layer of the first material;
   a first tie layer of the second material;
   a nail sealable layer of the third material;
   a second tie layer of the second material; and
   a second inert layer of the first material;
   wherein the nail sealable layer is between the first tie layer and the second tie layer;
   wherein the first tie layer is between the first inert layer and the nail sealable layer;
   wherein the second tie layer is between the second inert layer and the nail sealable layer; and
   wherein the total film thickness is between 0.002 inch and 0.010 inch and wherein the film has a Water Vapor Transmission Rate of less than 0.5 grams per one hundred square inches per day.

19. The process of claim 18, wherein the total film thickness is greater than 0.004 inch.

20. The process of claim 18, wherein the first material comprises a low-density polyethylene and an ethylene vinyl acetate copolymer resin; and
   wherein the second material comprises a polypropylene impact modified copolymer and a thermoplastic polyolefin.

* * * * *